Jan. 25, 1966  H. W. HOLM ETAL  3,231,150
METERING BUTTON CAP FOR PRESSURIZED CONTAINER VALVES
Filed Feb. 26, 1964  2 Sheets-Sheet 1

INVENTORS
HARRY W. HOLM
LAWRENCE T. WARD
BY
ATTORNEYS

Jan. 25, 1966 H. W. HOLM ETAL 3,231,150
METERING BUTTON CAP FOR PRESSURIZED CONTAINER VALVES
Filed Feb. 26, 1964 2 Sheets-Sheet 2

INVENTORS
HARRY W. HOLM
LAWRENCE T. WARD
BY
ATTORNEYS

United States Patent Office 3,231,150
Patented Jan. 25, 1966

3,231,150
METERING BUTTON CAP FOR PRESSURIZED CONTAINER VALVES
Harry Wilhelm Holm, Oslo, Norway, and Lawrence T. Ward, Portland, Pa., assignors to Seary Ltd., Zug, Switzerland
Filed Feb. 26, 1964, Ser. No. 347,564
10 Claims. (Cl. 222—355)

This invention relates to valves for pressurized containers, particularly of the aerosol type, and the invention more especially relates to a metering valve assembly for controlling the amount of spray released and to a button cap for converting a continuous flow valve assembly into a metering valve assembly.

As usually constructed aerosol dispensing containers include a liquid active ingredient which is maintained under suitable pressure in the container by a propellant so that when a manually operated valve on the container is opened, an aerosol mixture of material is discharged through the valve stem to the atmosphere, a push button being provided for actuating the valve stem. Some of these containers provide for continuous discharge, whereas others are provided with mechanism for automatically metering the discharge to a predetermined amount.

The metering mechanism, and particularly the metering button caps which have heretofore been proposed are objectionable for one reason or another, and especially because of their excessive cost. The metering mechanism, and particularly the button cap, of the present invention, has been devised with the object of reducing to a minimum the number of parts required, and constructing these parts in such a manner as to permit not only their manufacture on automatic machines, but also the rapid assembly thereof, either manually or by machine.

A particular difficulty which has been experienced in connection with some of the prior button cap metering devices is a tendency to produce a continuous instead of a metered spray unless the mechanism is operated with considerable care, and this difficulty has been overcome by the present construction.

Other advantages of the construction according to the present invention are the fact that the discharge passage from the metering chamber to the nozzle is so arranged as to be self-cleaning; also the fact that the size of the measuring or metering chamber can easily be changed to meet the requirements in dispensing any particular product; and further the fact that the mechanism does not interfere with the rapid filling of the dispensing containers with the product.

The metering button cap of the present invention comprises an inverted cuplike or thimblelike casing member having a flexible outer end wall and a tubular member mounted for sliding movement within the cuplike member. The tubular member is connected to the outer end of the conventional tubular valve stem of the aerosol container and forms therewith the metering chamber. This connection may be made by means of a bushing which can be varied in size or shape to provide the desired capacity of metering chamber. The cuplike casing member is provided with a nozzle or discharge outlet which extends laterally through a side wall thereof, and the outer ends of the two telescoping members are disposed adjacent one another and arranged to cooperate to form a valve means for controlling the flow from the metering chamber to the discharge outlet. The path of flow from the valve means to the nozzle includes the space between the sliding surfaces of the tubular member and the interior of the casing member, and because of the relative motion between these parts such path is self-cleaning.

An advantageous feature of the improved button cap construction is that any tendency to produce continuous flow instead of metered flow has been eliminated. In order to accomplish this the portion of the outer end of the casing member which constitutes the movable part of the valve means is formed as a rigid member at the center of the outer end, this rigid portion being circular in form and surrounded by an annular thin flexible area which extends to the cylindrical wall of the cuplike member. Also, such rigid portion is disposed on the interior of the end wall thus leaving the outer surface thereof smooth and continuous. The interior rigid portion co-acts with the outer end of the tubular member to form the valve means, and advantageously the tubular member is also provided with an end wall and the valve aperture through this end wall is disposed centrally thereof and is of relatively small size. Also, the interior surface of the rigid portion of the outer end wall of the cuplike casing member is made flat and co-acts with a small flat annular surface surrounding the valve aperture to control flow therethrough.

The metering chamber is constituted of the interior space within the tubular member together with the area of the hollow valve stem, and this metering area can be varied by increasing or decreasing the diameter of the tubular member itself or by the employment therewith of a bushing between the outer surface of the valve stem and the inner surface of the tubular member.

Another advantageous feature of the invention is the special construction at the inner ends of the inner telescoping tubular member and outer cuplike casing member. The casing member is provided with a cylindrical rib portion surrounding the exterior of its bottom or inner edge. The tubular member has surrounding its inner end a cylindrical ring portion or member which is integrally connected to the inner end by means of a flexible diaphragm. The ring portion is provided at its outer end with an inwardly projecting annular lip, the internal diameter of the ring portion corresponding to the diameter of the cylindrical rib portion. Such rib portion is received within the cylindrical ring to maintain the parts in assembled relationship. This is possible since the parts are made of a somewhat resilient plastic material such as polyethylene.

The accompanying drawing illustrates a number of practical embodiments of the invention. In this drawing.

Figure 1:
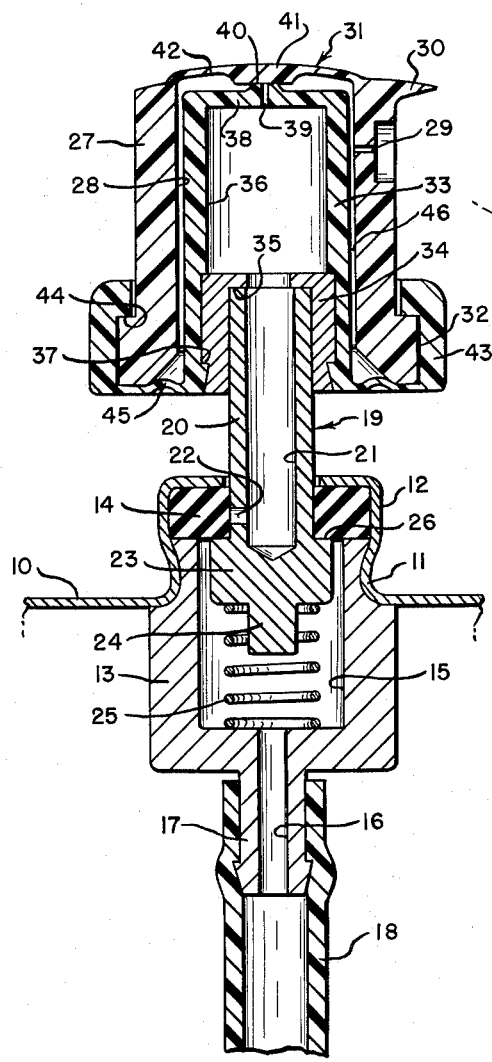
FIG. 1 is a view in central vertical section showing one form of the improved button cap mounted on a conventional hollow valve stem of the valve mechanism as used in conventional non-metering valves for pressurized containers of the aerosol type.
Figure 2:
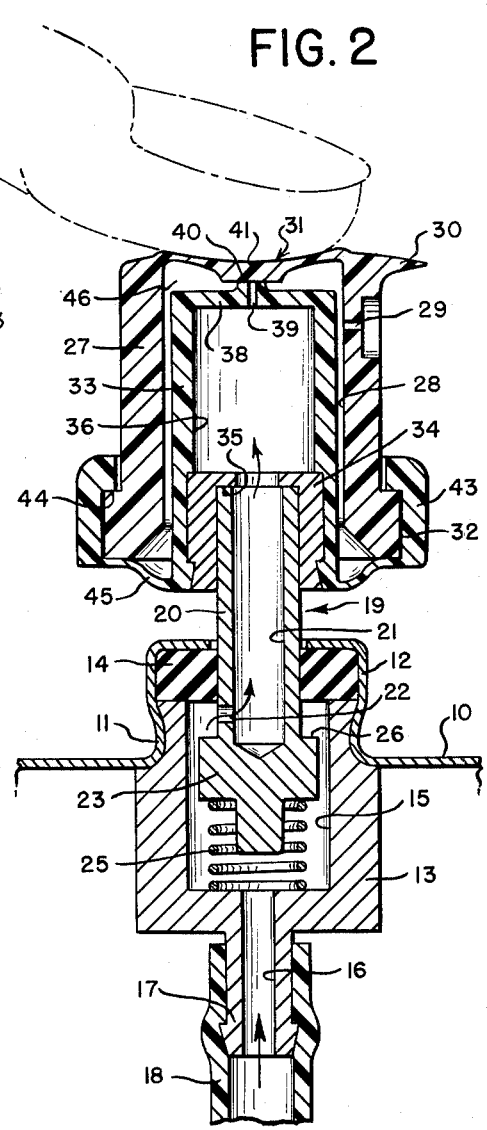
FIG. 2 shows the same mechanism as FIG. 1 when the cap and stem are depressed by finger pressure.
Figure 3:
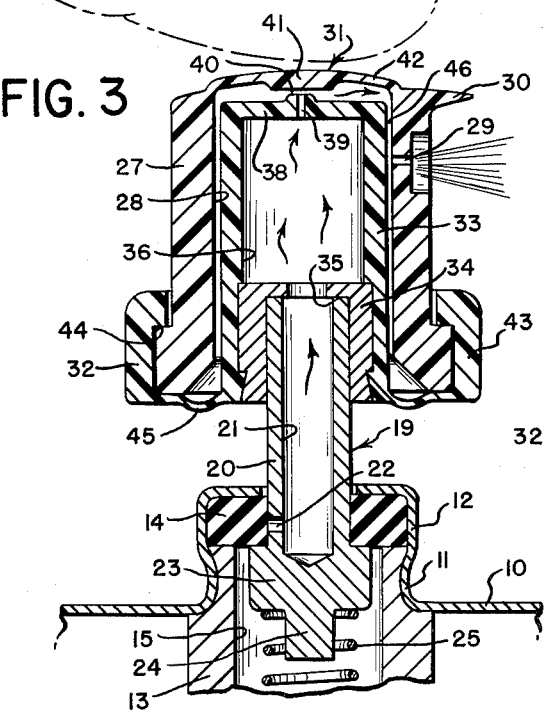
FIG. 3 shows the same valve mechanism when the finger pressure has been released and during the discharge of the metered amount of spray.

Referring to the drawing, in which like parts have the same reference numerals, and in particular to FIGS. 1, 2 and 3 a conventional pressurized aerosol container 10 has a circular centrally apertured conventional top. A circular crimping groove 11 and a vertical cylindrical neck 12 grip the tubular valve housing 13 and hold it in fixed position on the container.

A rubber or plastic sealer ring 14 is secured within neck 12 above valve housing 13 and makes a gas tight seal with the valve housing. The conventional housing 13 is provided with a circular central chamber 15 that connects with an inlet passage 16 at the bottom which extends through an integrally depending nipple 17. Nipple 17 receies a plastic or rubber dip tube 18 which extends to the bottom of the aerosol container.

A depressible hollow valve stem 19 has a top tubular section 20 in which a central bore 21 terminates at its lower end in a lateral port opening 22. Valve stem 19 has a central cylindrical valve member 23 at its lower end which is larger in diameter than the top tubular section 20 but is smaller than the diameter of chamber 15 to permit passage of fluid. Valve member 23 has a lug 24 at the bottom, and a coil spring 25 is placed about this lug and rests at its lower end on the bottom of chamber 15.

The sealer ring 14 surrounds the exterior surface of valve stem 19 in a gas tight manner at all times and valve member 23 has a ledge 26 which effects a gas tight closure with ring 14 when the valve stem is in its normal non-finger-actuated position as shown in FIG. 1, the stem being biased outwardly of the container by coil spring 25. The structure described to this point is conventional in many aerosol-type containers delivering a non-metered spray.

Figure 4:
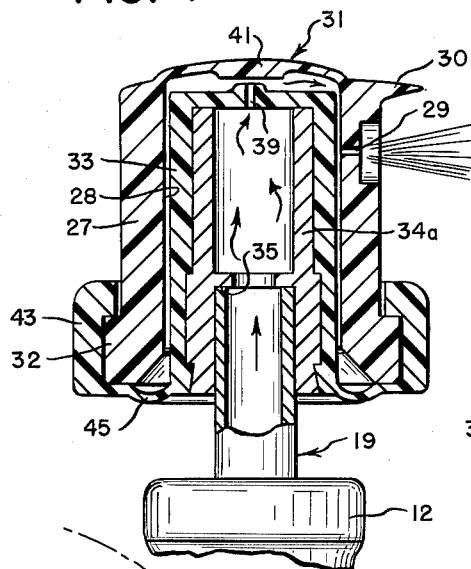
FIGS. 4, 5 and 6 are similar sectional views of 3 modified forms of the button cap construction of the invention.
Figure 6:
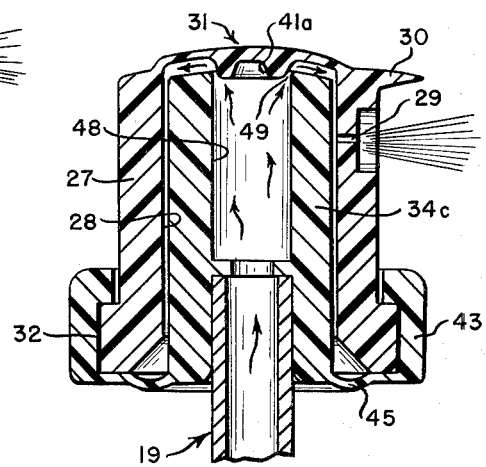
Figure 5:
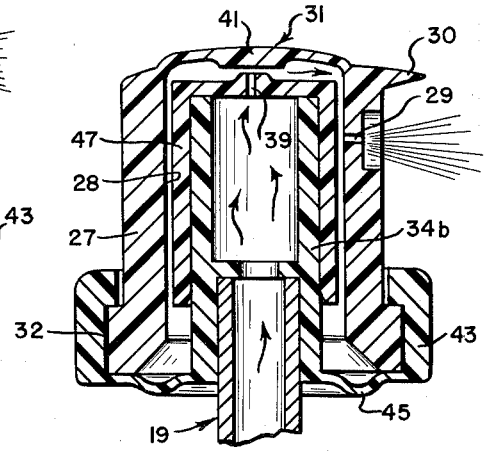

FIGS. 1, 2 and 3 illustrate an advantageous form of my improved stem-depressing button cap and FIGS. 4, 5 and 6 show three modifications. In all these forms of the invention however the outer member or casing of the cap is an inverted cuplike member 27 which has an inner cylindrical bore 28. The cylindrical wall of casing member 27 is provided with a conventional discharge orifice or nozzle 29 which includes a passage extending through the wall from the bore 28. A direction indicator 30 is arranged directly above the nozzle 29. The cuplike member 27 is also provided with a flexible resilient upper end wall 31, and extending around the lower end of the skirt portion of member 27 there is a continuous cylindrical rib portion 32, both of which will be referred to in greater detail later on.

Also, in all forms of the invention shown in FIGS. 1–6 a tubular member is mounted for sliding movement within bore 28 of the outer cuplike casing member 27, and the outer or upper ends of these two members are adjacent one another and cooperate to form valve means for controlling the metered flow to the discharge nozzle 29.

Referring now particularly to the form of the invention shown in FIGS. 1–3, the tubular member referred to is in the form of a second or inner inverted cuplike member 33. The inner member 33 is freely slidable within bore 28 of the outer member. Secured within the lower portion of the inner cuplike member 33 is a bushing 34 which sealingly engages the upper portion of valve stem 19. An annular seat 35 is provided internally of bushing 34 at its upper end to positively engage the end of valve stem 19 so that pressure on the top of the bottom cap will depress the valve stem. Bushing 34 is locked within the bore 36 of the inner cuplike member 33 by means of an internal projecting circular projection 37 on the wall of bore 36 and a corresponding tapered recess in the outer surface of bushing 34.

The metering chamber area includes the area within bore 36 of the inner sliding member 33 and the area within central bore 21 of the valve stem. The volume of this metering area may be varied, as for example, by arranging bushing 34 to extend to a greater or less extent into bore 36, or by providing a series of interchangeable inner members 33 of differing wall thickness.

Inner cuplike member 33 has an upper or outer end wall 38 which is disposed closely adjacent the flexible end wall 31 of cuplike member 27 and which is provided with a central valve opening or aperture 39. Surrounding this aperture on the outer surface of wall 38 there is a small flat annular surface 40 surrounding aperture 39. To co-act with this surface to close and open this valve aperture the flexible end wall 31 on the outer or casing member 27 is provided with a rigid central section 41 mounted interiorly of wall 31 and having a smooth flat surface to co-act with the flat surface 40. Rigid section 41 is surrounded by an annular area 42 which is flexible and resilient.

The lower ends of the outer and inner skirt portions of the two cup members 27 and 33 are interconnected by the rib and ring construction shown for example in FIG. 1. The cylindrical rib 32 around the lower end of outer cup member 27 is received within a ring portion 43. The interior surface of this ring portion is cylindrical and dimensioned to receive the cylindrical rib portion 32. The parts are held in assembled relationship by means of an annular lip 44 which projects inwardly above and in contact with the upper side of rib member 32. Ring portion 43 is integrally joined to the lower end of the inner cup member 33 by means of a thin flexible diaphragm 45. Although the surfaces of the rib 32 and the interior of ring portion 33 are in intimate contact, under some circumstances, it may be desirable to join these surfaces together by some appropriate method such as heat sealing.

In the operation of the device, when it is desired to cause a metered spray to be ejected from the nozzle 29, the flexible upper end 31 of casing member 27 is depressed by the finger from the normal position shown in FIG. 1 to that shown in FIG. 2. The finger pressure is transmitted to the inner cuplike member 33 forcing it downwardly, flexing diaphragm 45 and depressing valve stem 19 against the force of coil spring 25. Stem 19 is moved downwardly until port opening 22 in the tubular section 20 of the valve stem is moved below the lower surface of sealing ring 14. This permits aerosol material to pass from dip tube 18 and valve housing 13 through opening 22 and fill the bore 21 of hollow stem 20 and the area within the inner cuplike member 33 until the pressure therein is equalized with the pressure within the aerosol container 10. The aerosol material cannot escape however so long as the finger pressure holds the valve means 39, 41 closed.

However, when the finger is removed as indicated in FIG. 3, the force of spring 25 causes the valve at the lower end of valve stem 19 to close and the removal of finger pressure on end wall 31 causes valve means 39, 41 to open. This permits the aerosol material contained within the metering space to be discharged in a spray through the nozzle opening 29. In flowing from the valve means 39, 41 to the nozzle 29 the material passes through the small area between the upper surface of wall 38 and lower surface of flexible end wall 31 and then through the space 46 between the outer surface of the slidably mounted inner cuplike member 33 and the bore 28 of the outer cuplike member 27. This spray discharge continues until the pressure within the metering area and that of the surrounding atmosphere is equalized.

FIG. 3 is intended to illustrate the position of the parts at the instant the spray flow commences and consequently the flexible diaphragm 45 is distended downwardly somewhat as indicated by the pressure of the aerosol material. As soon as the pressure in the metering space equalizes with that of the atmosphere the parts return to the position shown in FIG. 1 where the valve means 39, 41 is closed.

The operation of the modified forms of construction shown in FIGS. 4, 5 and 6 is substantially the same as that just described. However, in the construction of FIG. 4, the bushing member 34a extends from end to end of the interior of the inner cuplike member 33 thus reducing the volume of the metering space. This metering space may also be either decreased or increased by providing a series of bushings 34a wherein the location of the seat 35 is either raised or lowered from that shown in FIG. 4, or the thickness of the walls above seat 35 is changed.

In FIG. 6 the bushing 34b is similar to bushing 34a of FIG. 4 but is of smaller diameter permitting the application to the outside thereof of an inverted cuplike member 47. Ring portion 43, however, is connected by the flexible diaphragm 45 to the lower end of the bushing 34b, instead of to the lower end of the inner cuplike member 47.

Referring now to FIG. 6 the inner tubular member 34c, like tubular member 34b is connected at its lower end by the flexible diaphragm 45 to ring portion 43. Tubular member 34c has thicker walls than member 34b inasmuch as the inner cuplike member 47 has been eliminated.

The valve means is provided between the flexible upper end wall 31 of the outer cuplike casing member 27 and the upper end of bore 48 of the bushing 34c. The valve means comprises the circular surface 49 at the upper end of this bore and the rigid section 41a on the interior surface of end wall 31, which in this instance has a circular periphery.

The filling of the aerosol container is accomplished before the application of the button cap to the valve stem so that the employment of the button cap does not interfere with quick filling.

The number of parts of the button cap have been reduced to a minimum, can all be produced by injection molding, and are capable of being assembled by automatic machine or manually as desired. Furthermore, the user cannot produce a continuous spray by careless manipulation of the button cap because the application of finger pressure on one side of the flexible wall 31 does not tend to cause a partial opening of the valve means.

While I have described a number of forms of my improved stem-depressing and metering button cap, it is obvious that there are other forms that, while not specifically disclosed in this specification, may come within the scope of the invention as determined by the claims.

I claim:

1. A button cap for converting into a metering valve a continuous flow valve for the outlet of a pressurized container having a tubular valve stem depressible to open the outlet valve, said button cap comprising an inverted cuplike casing member having a flexible outer end wall and a tubular member mounted for sliding movement within the cuplike member, the tubular member connected to the outer end of the tubular valve stem and forming therewith a metering chamber, the casing member having a spray nozzle passage extending through the side wall thereof, the outer ends of the two members being adjacent one another and cooperating to form valve means for controlling flow to the nozzle from the metering chamber, the outer end wall of the casing member having a rigid central portion forming the valve member and surrounded by an annular flexible portion so as to permit the application of finger pressure to the end of the casing member to actuate the valve means and to permit said pressure to be transmitted to the tubular member and thence to the valve stem to open the valve thereof and cause the metering chamber to be filled, upon the release of the finger pressure the valve stem moving to close the valve and the annular flexible portion of the said end wall permitting the valve means to open under the pressure of the material within the metering chamber.

2. A metering button cap as set forth in claim 1 wherein the tubular member has the form of an inner cuplike member arranged to slide within the casing member, the inner cuplike member having an end wall disposed adjacent the end wall of the casing member and having a discharge valve aperture extending centrally therethrough, a small annular ridge surrounding said aperture on the outer surface of the end wall, and the valve member on the end wall of the casing cooperating with said annular ridge to control flow through the aperture.

3. A metering button cap as set forth in claim 2 wherein the two telescoping cuplike members are substantially co-extensive lengthwise, and wherein the casing member is provided with an exterior cylindrical rib portion around its inner end, and the inner cuplike member has a cylindrical ring portion integrally connected thereto at its inner end by a flexible diaphragm, the ring portion having at its outer end an inwardly projecting annular lip, the internal diameter of the ring portion corresponding to the diameter of the cylindrical rib portion, the cylindrical rib portion being received within the cylindrical ring portion to maintain the parts in assembled relationship.

4. A button cap for converting into a metering valve a continuous flow valve for the outlet of a pressurized container having a tubular valve stem depressible to open the outlet valve, said button cap comprising an inverted cuplike casing member having a flexible outer end wall and a tubular member mounted for sliding movement within the cuplike member, the tubular member connected to the outer end of the tubular valve stem and forming therewith a metering chamber, the casing member having a spray nozzle passage extending through the side wall thereof, the outer ends of the two members being adjacent one another and cooperating to form valve means for controlling flow to the nozzle from the metering chamber, the casing member having an exterior cylindrical rib portion surrounding its inner end, and the tubular member having a cylindrical ring portion integrally connected thereto at its inner end by a flexible diaphragm, the ring portion having at its outer end an inwardly projecting annular lip the internal diameter of the ring portion corresponding to the diameter of the cylindrical rib portion, the cylindrical rib portion being received within the cylindrical ring portion to maintain the parts in assembled relationship.

5. A metering button as set forth in claim 4 wherein the tubular member has the form of an inner cuplike member the end wall of which is disposed adjacent the end wall of the casing member.

6. A metering button cap as set forth in claim 4 wherein the tubular member has the form of an inner cuplike member arranged to slide within the casing member, the inner cuplike member having an end wall disposed adjacent the end wall of the casing member and having a discharge valve aperture extending centrally therethrough, a small annular ridge surrounding said aperture on the outer surface of the end wall, and the valve member on the end wall of the casing cooperating with said annular ridge to control flow through the aperture.

7. In a valve assembly for a pressurized container having a dispensing outlet and a valve for said outlet having a tubular valve stem depressible to open the outlet valve, the improvement which consists of an operating button for said valve stem said button comprising an inverted cuplike casing member having a flexible outer end wall and a tubular member mounted for sliding movement within the casing member, the tubular member connected to the outer end of the tubular valve stem and forming therewith a metering chamber, the casing member having a discharge passage extending through the side wall thereof, the outer ends of the two members being adjacent one another and cooperating to form valve means for controlling flow to the discharge passage from the metering chamber, the outer end wall of the casing member having a rigid central portion forming the valve member and surrounded by an annular flexible portion so as to permit the application of finger pressure to the end of the casing member to actuate the valve means and to permit said pressure to be transmitted to the tubular member and thence to the valve stem to open the valve thereof and cause the metering chamber to be filled, upon the release of the finger pressure the valve stem moving to close the valve and the annular flexible portion of the said end wall permitting the valve means to open under the pressure of the material within the metering chamber, the casing member having an exterior cylindrical rib portion surrounding its inner end, and the tubular member having a cylindrical ring portion integrally connected thereto at its inner end by a flexible diaphragm, the ring portion having at its outer end an inwardly projecting annular lip, the internal diameter of the ring portion corresponding to the diameter of the cylindrical rib portion, the cylindrical rib portion being received within the cylindrical ring portion to maintain the parts in assembled relationship.

8. A button cap for converting into a metering valve a continuous flow valve for the outlet of a pressurized container having a tubular valve stem depressible to open the outlet valve, said button cap comprising an outer inverted cuplike casing member having a flexible outer end wall and a tubular member within the casing member and connected to the outer end of the valve stem, an inner inverted cuplike member fitted in sealing engagement over the outer end portion of the tubular member and forming therewith and with the valve stem a metering chamber, the casing member having a spray nozzle passage extending through the side wall thereof, the outer ends of the two cuplike members being adjacent one another and cooperating to form valve means for controlling the flow to the nozzle from the metering chamber, the outer end wall of the casing having a rigid central portion surrounded by an annular flexible portion so as to permit the application of finger pressure to the end of the cuplike member to actuate the valve means and to permit said pressure to be transmitted to the tubular member and thence to the tubular valve stem to open the valve thereof and cause the metering chamber to be filled, upon the release of the finger pressure the valve stem moving to close the valve, and the annular flexible portion of the said end wall permitting the valve means to open under the pressure of the material within the metering chamber.

9. A metering button cap as set forth in claim 8 wherein the cuplike member has an exterior cylindrical rib portion surrounding its inner end and the tubular member has a cylindrical ring portion integrally connected thereto at its inner end by a flexible diaphragm, the ring portion having at its outer end an inwardly projecting annular lip, the internal diameter of the ring portion corresponding to the diameter of the cylindrical rib portion, the cylindrical rib portion being received within the cylindrical ring portion to maintain the parts in assembled relationship.

10. A metering button cap as set forth in claim 8 wherein the tubular member is provided with a cylindrical rib portion surrounding its inner end, and the cuplike member has a cylindrical ring portion integrally connected thereto at its inner end by a flexible diaphragm, the ring portion having at its outer end an inwardly projecting annular lip, the internal diameter of the ring portion corresponding to the diameter of the cylindrical rib portion, the cylindrical rib portion being received within the cylindrical ring portion to maintain the parts in assembled relationship.

References Cited by the Examiner
UNITED STATES PATENTS

| | | | |
|---|---|---|---|
| 2,892,576 | 6/1959 | Ward | 239—350 X |
| 3,019,947 | 2/1962 | Gorman. | |
| 3,138,301 | 6/1964 | Ward | 239—579 X |

RAPHAEL M. LUPO, *Primary Examiner.*